(12) United States Patent
Kotani et al.

(10) Patent No.: US 6,363,382 B1
(45) Date of Patent: Mar. 26, 2002

(54) DATA CLASSIFICATION METHOD AND DATA MANAGEMENT METHOD, DATABASE AND DATA STORAGE MEDIUM BASED ON THAT DATA CLASSIFICATION METHOD

(75) Inventors: Norihiko Kotani; Masami Hane, both of Yokohama (JP)

(73) Assignee: Semiconductor Leading Edge Technologies, Inc., Yokohama (JP)

(*) Notice: Subject to any disclaimer, the term of this patent is extended or adjusted under 35 U.S.C. 154(b) by 0 days.

(21) Appl. No.: 09/131,666

(22) Filed: Aug. 10, 1998

(30) Foreign Application Priority Data

Aug. 12, 1997 (JP) .............................................. 9-217862

(51) Int. Cl.[7] .......................... G06F 17/30; G06F 19/00
(52) U.S. Cl. .............................. 707/7; 707/100; 700/95; 700/101; 700/112; 700/121
(58) Field of Search ........................... 700/95, 101, 112, 700/121; 707/103, 100, 7

(56) References Cited

U.S. PATENT DOCUMENTS

| | | | | |
|---|---|---|---|---|
| 5,282,139 A | * | 1/1994 | Kobayashi | 700/101 |
| 5,436,848 A | * | 7/1995 | Nishida et al. | 700/112 |
| 5,586,039 A | * | 12/1996 | Hirsch et al. | 700/95 |
| 5,594,639 A | * | 1/1997 | Atsumi | 700/95 |
| 5,625,816 A | * | 4/1997 | Burdick et al. | 707/103 |
| 5,668,733 A | * | 9/1997 | Morimoto et al. | 716/19 |
| 5,687,085 A | * | 11/1997 | Morimoto et al. | 700/121 |
| 5,768,133 A | * | 6/1998 | Chen et al. | 700/95 |
| 5,889,674 A | * | 3/1999 | Burdick et al. | 700/121 |

FOREIGN PATENT DOCUMENTS

| | | |
|---|---|---|
| JP | 3-26449 | 2/1991 |
| JP | 4-2454 | 1/1992 |
| JP | 7-21271 | 1/1995 |

OTHER PUBLICATIONS

Tatsumi et al., MOSQue: A Novel TCAD Database System with Efficient Handling Capability on Measured and Simulated Data, (1997), pp. 265–268, Sep. 1997.

* cited by examiner

Primary Examiner—Frantz Coby
(74) Attorney, Agent, or Firm—Foley & Lardner

(57) ABSTRACT

Historical steps such as processes of fabrication are each assigned a predetermined character code. Character codes are gathered and arranged in chronological order of the fabrication processes for their classification. Using such a classification method, a database is built to include records each storing a plurality of measured data and accommodating data fields for retaining historical data.

9 Claims, 4 Drawing Sheets

Record #A

| serial number | historical data | wafer number | lot number | measured data 1 | measured data 2 | . . . . | image file number |
|---|---|---|---|---|---|---|---|

Record #B

| serial number | process number | processing condition (recipe) |
|---|---|---|

Record #C

| image file number | image data |
|---|---|

| process | character code |
|---|---|
| ion implantation | → A |
| oxidation | → B |
| diffusion | → C |

DATA CLASSIFICATION METHOD AND DATA MANAGEMENT METHOD, DATABASE AND DATA STORAGE MEDIUM BASED ON THAT DATA CLASSIFICATION METHOD

BACKGROUND OF THE INVENTION

1. Field of the Invention

The present invention relates to a data classification method for classifying data about the history of product fabrication and related steps, as well as to a data management method, a data base and a data storage medium based on that data classification method.

2. Description of the Related Art

Conventionally, data about the history of products and specifically about their fabrication processes are given meaningful names that illustratively represent combinations of such processes. Where the number of fabrication processes is large enough, the combinations resulting from even a minor change for fabrication improvement can be extensive. The combinations of such fabrication processes can be so numerous that it may be difficult to name—hence classify distinctly—all the processes involved. This in turn makes it impossible to know retroactively the historical data of the processes involved.

SUMMARY OF THE INVENTION

It is therefore an object of the present invention to provide a data classification method for allowing complex and varying fabrication processes having numerous conditional alternatives used in factories and the like to be precisely represented and distinctly classified by historical data about fabrication.

Typically, throughout the fabrication processes of semiconductor devices, there are occasions requiring the classification of impurity distributions, electrical characteristics, cross-sectional views and other measurements of fabricated wafers, as well as of the wafers themselves. In such cases, the present invention provides a method for readily knowing the history of specific wafers to which specific data belong as well as the processes of fabrication that the wafers have undergone. Besides classifying historical data on the fabrication of semiconductors, the inventive method may be used advantageously to classify the history of any goods and products fabricated or prepared by a plurality of processes or steps.

According to one aspect of the present invention, a data classification method comprises data fields for accommodating historical data constituted by combinations of a first kind of symbols, and each of the first kind of symbols represents each process making up a history.

According to another aspect of the present invention, a data classification method comprises data fields for accommodating a second kind of symbols corresponding to historical data. Each of the historical data is constituted by a combination of a first kind of symbols, and each of the first kind of symbols represents each process making up a history.

In the data classification method, the history may be associated with fabrication of products, and the first kind of symbols representing the processes denote types of processes constituting the fabrication.

In the data classification method, the first kind of symbols denoting the types of the processes constituting the fabrication may be delimited by delimiter symbols.

In the data classification method, the types of the processes constituting the fabrication may be each represented by either one or a fixed number of characters.

In the data classification method, the types of the processes constituting the fabrication may be each represented by a varying number of characters.

According to another aspect of the present invention, a data management method manages data according to any one of the data classification methods as described above.

According to another aspect of the present invention, a database comprises historical data classified according to any one of the data classification methods as described above.

According to another aspect of the present invention, a data storage medium stores historical data classified according to any one of the data classification methods as described above.

Briefly, the present invention comprises, in one embodiment, a computer implemented data classification and retrieval method for classifying, organizing and retrieving fabrication process data for a product by computer, comprising the steps of: representing each type of process in a plurality of processes for fabricating a product by a first kind of symbol; forming a first record file that includes a fabrication process representation by combining the first kinds of symbols in a chronological process sequence into a first character string; associating information with the record file for a plurality of the different first kinds of symbols in the character string; associating each character string with measurement data; and selecting and retrieving a plurality of record files that have the same character string.

In a further aspect of the present invention, the method comprises the steps of: representing a particular one of the character strings by a second kind of symbol; and forming a second record file by combining individual symbols in a chronological process sequence, including a symbol of the second kind, to form a second character string.

In a yet further aspect of the present invention, a memory is provided for storing data for access by a computer program executed on a data processing system, comprising: a data structure stored in the memory, the data structure including information resident in a database used by the computer program and including: a plurality of different process data objects of a first kind, each different data object of a first kind representing a different fabrication process for a product; a plurality of different first character string data objects, each different first character string data object representing a first chronological fabrication process and being formed by combining a plurality of the process data objects of a first kind in a chronological process sequence; at least one process data object of a second kind for representing one of the plurality of first character string data objects; and at least one second character string data object representing a second chronological fabrication process and being formed by combining individual process data objects, including at least one process data object of the second kind.

Other and further objects, features and advantages of the invention will appear more fully from the following description.

DETAILED DESCRIPTION OF THE PREFERRED EMBODIMENT

Preferred embodiments of the invention will now be described with reference to the accompanying drawings. Whereas the invention may be applied to diverse methods for classifying historical data about a plurality of steps or processes for fabrication as mentioned above, the description that follows will center on the fabrication of semiconductor devices for purposes of illustration.

First Embodiment

Figures 1, 2:
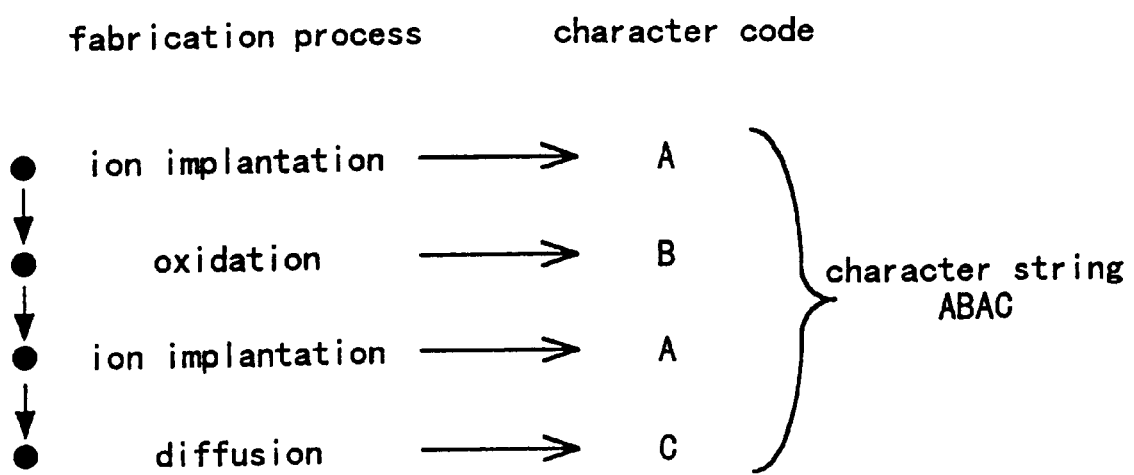
FIG. 1 shows character codes representing specific processes employed in the fabrication of a semiconductor device, and being adopted in a data classification method in a first embodiment of the present invention.
FIG. 2 shows a fabrication process of a semiconductor device including ion implantation, oxidation, another ion implantation, and diffusion, carried out in that order in a first embodiment of the present invention.
Figure 3:
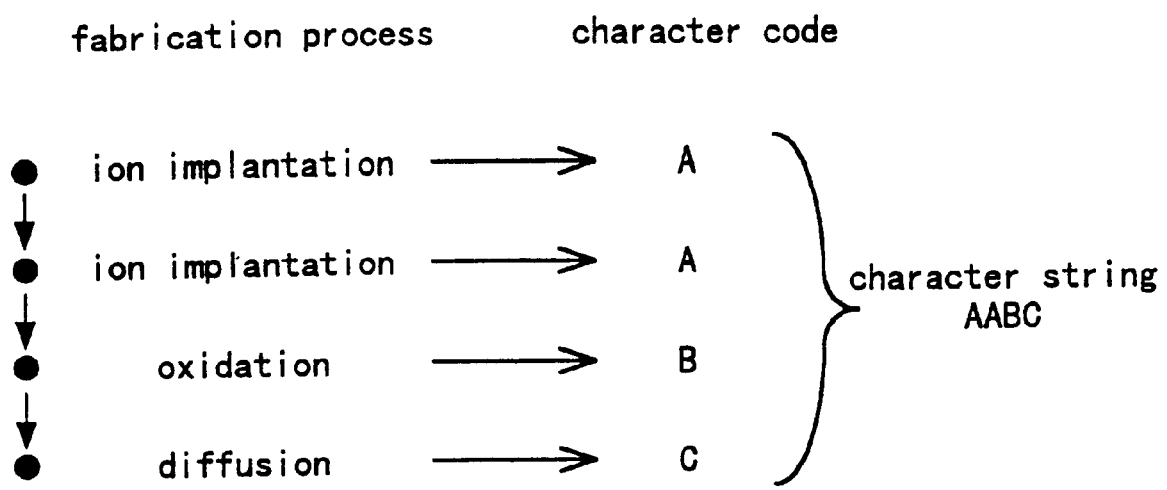
FIG. 3 shows another fabrication process of a semiconductor device including ion implantation, another ion implantation, oxidation, and diffusion, executed in that order.

FIGS. 1 through 3 illustratively show a data classification method practiced as a first embodiment of the present invention. FIG. 1 shows some symbols or character codes representing specific processes employed in the fabrication of semiconductor devices. In the example of FIG. 1, character A stands for ion implantation, B for oxidation, and C for diffusion. That is, every fabrication process is assigned a suitable symbol or character code (simply referred to as the character code or character hereunder).

FIG. 2 shows a fabrication process of ion implantation, oxidation, another ion implantation, and diffusion, carried out in that order. Using the character code scheme of FIG. 1, these processes may be classified as "ABAC." Fabrication processes in FIG. 3 include ion implantation, another ion implantation, oxidation, and diffusion, executed in that order, and are thus assigned a character string of "AABC." The processes in FIG. 3, although similar to those in FIG. 2, are nevertheless made distinct when they are coded as "AABC." Such classification facilitates data searches through databases and file systems on computers.

Although character codes are used above as an example, this is not limitative of the present invention. Any other broadly defined symbols may be used, including ordinary and special characters of any languages, visually recognizable pictures, bit patterns recognized by computers, and others. Such symbols apply to all embodiments and variations of this invention.

As described, the first embodiment provides a data classification method for allowing combined symbols representing different fabrication processes (i.e., individual steps of fabrication history) to constitute fabrication process data (historical data) that are accommodated in data fields. When the proceedings of fabrication are classified in this manner, simply checking a given character string pattern allows users to readily identify the fabrication processes involved.

In the foregoing description, the processes in FIG. 2 are coded as "ABAC" and those in FIG. 3 as "AABC." That is, one process is assigned one character. Alternatively, a predetermined combination of processes may be represented by a single or a small number of characters. For example, the character string "ABAC" may be replaced by α and "AABC" by β.

The above scheme requires, in subsequent interpretation, characters such as β to be translated illustratively to "ABAC." Still, it offers the advantage of representing the processes involved by use of a limited number of characters. Where there is a database system in which combinations of substantially identical processes are coded by different rules, the abbreviated codes (e.g., α and β) may be utilized for cross-translation.

The data classification method realized by the first embodiment is summarized as follows. That is, a data classification method is obtained in which plural symbols are stored in data fields for data classification, and each of the symbols corresponds to historical data made of other combined symbols that represent different historical steps respectively (e.g., individual processes of fabrication).

Second Embodiment

Figure 4:
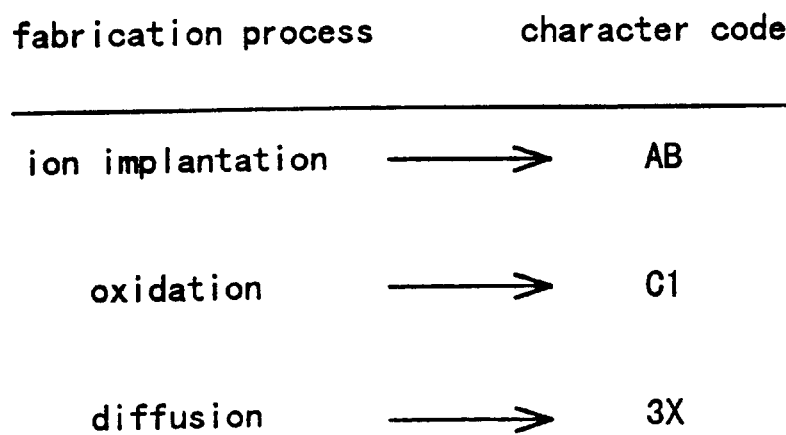
FIG. 4 shows another character codes representing specific processes employed in the fabrication of a semiconductor device, and being adopted in a data classification method in a second embodiment of the present invention.
Figure 5:
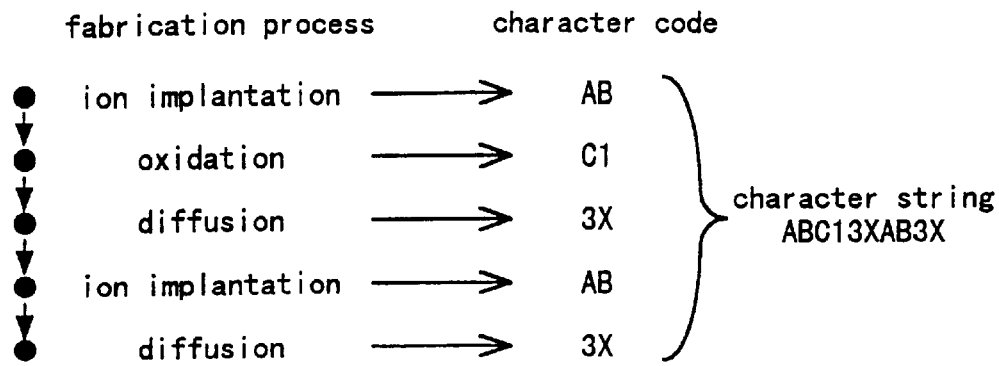
FIG. 5 shows a fabrication process of a semiconductor device including ion implantation, oxidation, diffusion, another ion implantation, and another diffusion carried out in that order in a second embodiment of the present invention.

FIGS. 4 and 5 illustratively show a data classification method practiced as a second embodiment of the present invention. The second embodiment involves the use of a fixed number of characters representing different processes of fabrication. For example, as shown in FIG. 4, the process "ion implantation" is coded by two characters AB, "oxidation" by C1, and "diffusion" by 3X. With such coding in use, the fabrication processes of FIG. 5 comprising ion implantation, oxidation, diffusion, another ion implantation, and another diffusion (carried out in that order) are coded as "ABC13XAB3X."

It is quite easy for computers to search for the above kind of character strings. There is no need for users to be aware of those character strings that need only be processed internally by computer. Illustratively, phrases such as ION IMPLANTATION need only be selected on the screen by use of a suitable input device (e.g., mouse). The larger the number of process-coding characters, the greater the number of fabrication processes that may be coded and classified.

As described, the second embodiment classifies fabrication processes in such a manner that simply checking any given character string pattern allows users to readily identify the different processes involved.

Third Embodiment

Figure 6:
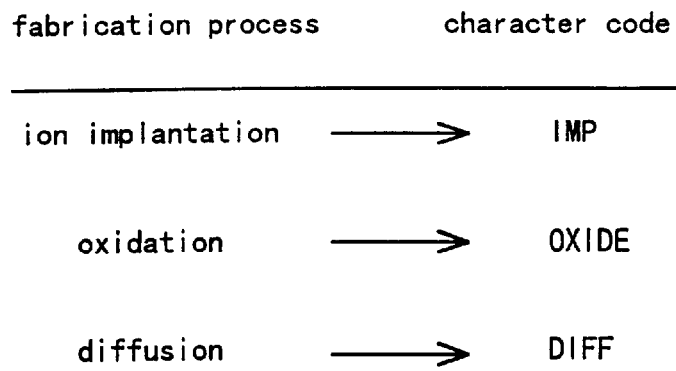
FIG. 6 shows another character codes representing specific processes employed in the fabrication of a semiconductor device, and being adopted in a data classification method in a third embodiment of the present invention.
Figure 7:
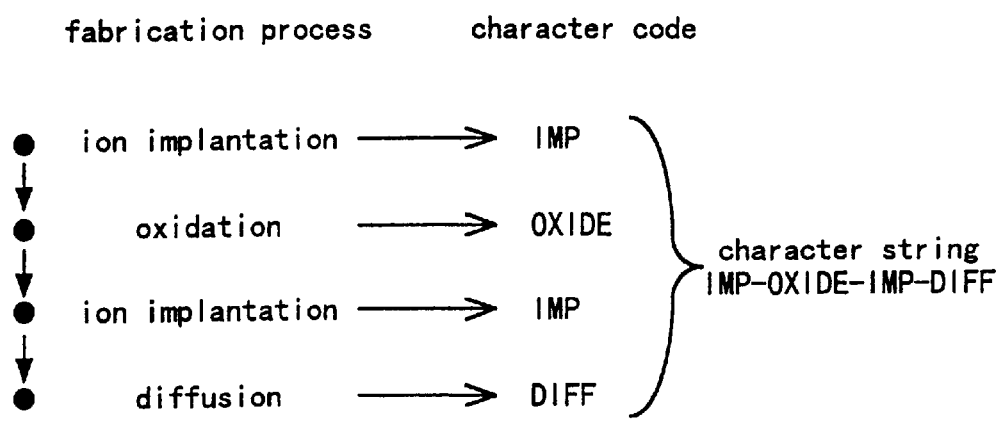
FIG. 7 shows a fabrication process of a semiconductor device including ion implantation, oxidation, another ion implantation, and diffusion carried out in that order in a third embodiment of the present invention.

FIGS. 6 and 7 illustratively show a data classification method practiced as a third embodiment of the present invention. The third embodiment involves the use of character codes of varying lengths representing different fabrication processes. This requires a separate code that serves as a delimiter between succeeding codes which denote processes respectively.

FIG. 6 shows character codes assigned to typical processes of fabrication in connection with the third embodiment. Specifically, the process of "ion implantation" is coded as IMP, "oxidation" as OXIDE, and "diffusion" as DIFF; the processes are coded by use of characters in varying numbers. With this coding scheme in use, the fabrication processes shown in FIG. 7 comprising ion implantation, oxidation, another ion implantation, and diffusion (carried out in that order) are coded as "IMP-OXIDE-IMP-DIFF." Because the number of characters making up a code that represents each process is different, a hyphen (−) is used as a delimiter between the succeeding codes.

As described, the third embodiment classifies fabrication processes in such a manner that simply checking any given character string pattern allows users to readily identify the different processes involved.

Figure 8:
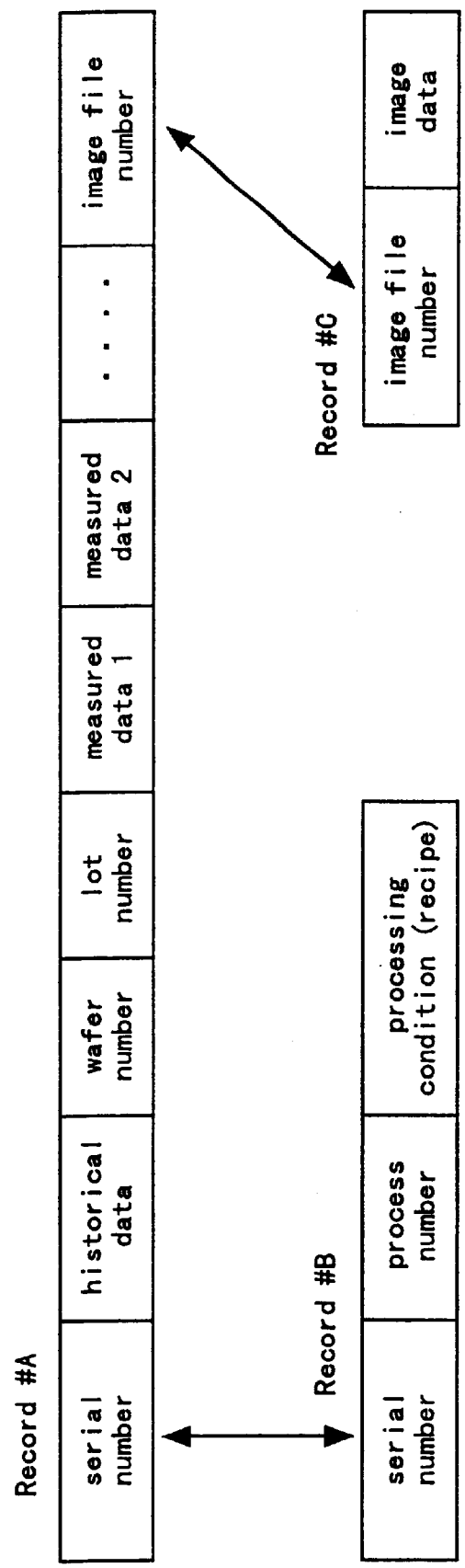
FIG. 8 illustrates a structure of a typical database in a fourth embodiment of the present invention.

Fourth Embodiment FIG. 8 illustrates a typical database practiced as a fourth embodiment of the present invention. FIG. 8 illustrates a single record #A in that database. As illustrated, the record #A has data fields accommodating a serial number, historical data, a wafer number, a lot number, measured data 1, measured data 2, etc., and an image file number.

That is, the record #A includes a plurality of measured data items in addition to such historical data on fabrication processes as described in connection with the first through the third embodiments of the present invention. The record #A is accompanied by a record #B and a record #C. The record #B stores detailed processing conditions for each process, and the record #C holds the image data associated with the record #A.

In the record #A, the historical data represented by a character string identify the sequence of the processes involved. Details of each process are not included; they are held separately in the record #B. The records #A and #B are matched by a serial number. For each record #A, there are as many records #B as the process count specified in the character string of the record #A in question. The sequence of the processes involved is designated by the process numbers. The records #B having the same serial number may be retrieved so as to rearrange their process numbers in suitable order. This permits detailed contents of the record #A to be known. The historical data in the record #A are constituted by a character code representing different processes whose process numbers, not included in the record #A, are readily recognized by computer.

The record #C accommodates an image file. Image data are generally made up of large amounts of data and would hamper high-speed data processing if integrated in the record #A. Thus the record #A stores only the file number of the image file in question. The record #C holds image data associated with the image file number.

When a database comprising historical data on fabrication processes is built as described, simply checking any given character string pattern of such historical data allows users to recognize different processes easily. This means that, illustratively, data representing a plurality of measurements of a semiconductor wafer fabricated by specific processes may be supplemented with a data field that stores the corresponding character string. Such fields are destined for use by computer, whereby data identifying different fabrication processes are accumulated and classified. When any of the data thus classified are retrieved, data search operations may be carried out at high speed through character string pattern matching. Thus the invention applies not only to data files but also to databases.

As a variation of the present invention, there may be provided a data management method for managing historical data in accordance with one of the above-described embodiments of the present invention. The above-described historical database may be built by accumulating historical data classified by one of the above embodiments. Another variation of the present invention may be a data storage medium that accommodates such a database comprising historical data classified by one of the above-described embodiments.

To sum up, the present invention provides a data classification method for allowing complex and varying fabrication processes having numerous conditional alternatives used in factories for instance to be precisely represented and distinctly classified by historical data about fabrication. The present inventive method makes it possible to search the historical data that have been conventionally difficult to handle as objects to be searched through. This makes it possible to search for and retrieve desired data about the history of numerous processes for fabricating goods and products.

In case the differences between diverse measured data about products fabricated by similar processes are to be evaluated, the inventive method enables users to search retroactively for detailed fabrication processes that should be verified. There is no need for the conventional practice of manually preparing necessary historical data from huge quantities of paper files and data outputs.

In manufacturing factories or plants where continuous product amelioration is the norm, the present invention, when embodied as described, ensures reliable management of fabrication processes and products. Using the inventive method, computers can drastically shorten the time required illustratively to search retroactively for what caused specific product defect or to search historical data on fabrication for the causes of subsequently detected differences in measurements—chores frequently experienced.

Obviously many modifications and variations of the present invention are possible in the light of the above teachings. It is therefore to be understood that within the scope of the appended claims the invention may by practiced otherwise than as specifically described.

We claim:

1. A computer implemented data classification and retrieval method for classifying, organizing and retrieving fabrication process data for a product by computer, comprising the steps of:

representing each type of process in a plurality of processes for fabricating a product by a corresponding symbol, each corresponding symbol being of a first kind of symbol;

forming a first computer record file that includes a fabrication process representation by combining symbols of said first kind of symbol into a first character string, with an order of said symbols representing a chronological process sequence;

associating information with said computer record file for a plurality of different symbols of said first kind of symbol in said first character string;

associating said first character string with measurement data; and selecting and retrieving a plurality of computer record files that have the same character string as said first character string.

2. The method according to claim 1, further comprising the steps of:

representing said first character string by a symbol of a second kind of symbol; and forming a second record file by combining individual symbols, including a symbol of said second kind of symbol, to form a second character string, with an order of said symbols representing a chronological process sequence.

3. The method according to claim 1, wherein symbols of said first kind of symbol denoting said types of said processes constituting said fabrication are delimited by delimiter symbols in said first character string.

4. The method according to claim 1, wherein said types of the processes constituting said fabrication process representation are each represented by either one or a fixed number of characters.

5. The method according to claim 1, wherein said types of the processes constituting said fabrication process representation are each represented by a varying number of characters.

6. A method according to claim 1, wherein said processes are semiconductor processes.

7. A memory for storing data for access by a computer program executed on a data processing system, comprising:

a data structure stored in said memory, said data structure including information resident in a database used by said computer program and including:

a plurality of different process data objects of a first kind, each different data object of a first kind representing a different fabrication process for a product;

a plurality of different first character string data objects, each different first character string data object representing a first chronological fabrication process and being formed by combining a plurality of said process data objects of a first kind with an order of said process data objects representing a chronological process sequence;

at least one process data object of a second kind for presenting one of said plurality of first character string data objects; and at least one second character string data object representing a second chronological fabrication process and being formed by combining individual process data objects, including at least one process data object of a second kind.

8. A memory according to claim 7, wherein said process data objects of a first kind include process information for processing a semiconductor chip.

9. A memory according to claim 8, wherein said character string data objects include measured data.

* * * * *